(12) United States Patent
Wang

(10) Patent No.: US 10,247,319 B1
(45) Date of Patent: Apr. 2, 2019

(54) PUMP HEAD

(71) Applicant: BETO ENGINEERING AND MARKETING CO., LTD., Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 0 days.

(21) Appl. No.: 15/838,975

(22) Filed: Dec. 12, 2017

(51) Int. Cl.
*F16K 15/20* (2006.01)
*F04B 39/12* (2006.01)
*B60S 5/04* (2006.01)

(52) U.S. Cl.
CPC ............... *F16K 15/20* (2013.01); *B60S 5/04* (2013.01); *F04B 39/123* (2013.01); *Y10T 137/3584* (2015.04); *Y10T 137/3724* (2015.04)

(58) Field of Classification Search
CPC . Y10T 137/3584; Y10T 137/3724; B60S 5/04
See application file for complete search history.

(56) References Cited

U.S. PATENT DOCUMENTS

| 5,762,095 | A | | 6/1998 | Gapinski et al. | |
|---|---|---|---|---|---|
| 5,975,109 | A | * | 11/1999 | Wu | B60S 5/04 137/223 |
| 6,048,181 | A | * | 4/2000 | Chang | B05B 9/0426 222/334 |
| 6,146,116 | A | * | 11/2000 | Wu | F04B 33/005 137/223 |
| 6,202,714 | B1 | * | 3/2001 | Wang | B60S 5/04 141/301 |
| 6,220,274 | B1 | * | 4/2001 | Wang | F16K 31/5245 137/231 |
| 2003/0234042 | A1 | * | 12/2003 | Delorme | F16L 37/05 137/231 |
| 2007/0062579 | A1 | * | 3/2007 | Leidenheimer | F16K 15/20 137/231 |
| 2008/0190489 | A1 | * | 8/2008 | Wrubel | F16L 37/1215 137/231 |
| 2009/0188570 | A1 | * | 7/2009 | Lin | B60S 5/04 137/231 |

\* cited by examiner

*Primary Examiner* — R. K. Arundale
(74) *Attorney, Agent, or Firm* — Muncy, Geissler, Olds & Lowe, P.C.

(57) ABSTRACT

A pump head includes a casing unit, a tightening member and a control unit. The casing unit includes a main body and an abutment wall connected to the main body. The main body has an installation section. The tightening member is disposed in the installation section proximally to the abutment wall. The control unit includes a control valve, a resilient member and a control lever. The control valve is movably disposed in the installation section. The resilient member urges the control valve toward the abutment wall to clamp the tightening member between the control valve and the abutment wall. The control lever is connected to the main body and operable to move the control valve against the resilient member and away from the abutment wall.

13 Claims, 9 Drawing Sheets

PUMP HEAD

FIELD

The disclosure relates to a pump head, and more particularly to a pump head for connecting an air supply source and an air valve.

BACKGROUND

Referring to FIGS. 1 to 3, a pump head 1 disclosed in U.S. Pat. No. 5,762,095 for connecting an air supply source 11 and an air valve 12 is shown. The pump head 1 includes a cylindrical body 131, two spaced-apart flanges 132 extending upwardly from the cylindrical body 131, a slot 133 formed between the flanges 132, and a lateral hollow arm 134 projecting from the cylindrical body 131 for connecting the air supply resource 11. The cylindrical body 131 has an open end 130, and a chamber 135 communicated with the slot 133. A cam lever 15 is pivotally disposed in the slot 133 through a pivotal pin 60. A coupler unit 16 is disposed in the chamber 135. An end cap 17 is connected to the open end 130.

The cam lever 15 includes cam head 151 for insertion of the pivotal pin 14, and a handle 152 extending outwardly from the slot 133. The cam head 151 has a first engagement surface 153 and a second engagement surface 154 perpendicular to the first engagement surface 153. A distance between the first engagement surface 153 and the pivotal pin 14 is smaller than a distance between the second engagement surface 154 and the pivotal pin 14. The coupler unit 16 includes a plug 161 abutting the cam head 151, a deformable tightening ring 162 spaced apart from the plug 161, and a spacer 163 abutting between the plug 161 and the tightening ring 162.

As shown in FIGS. 1 and 2, when the pump head 1 is in an initial state, the first engagement surface 153 abuts the plug 161 of the coupler tightening unit 16, and the air valve 12 can extend into the end cap 17, the tightening ring 162 and the spacer 163. When the cam lever 15 is rotated about the pivotal pin 14, the second engagement surface 154 abuts against the plug 161 (see FIG. 3). Because the distance between the second engagement surface 154 and the pivotal pin 14 is greater than the distance between the first engagement surface 153 and the pivotal pin 14, the plug 161 and the spacer 163 are moved together to press and deform the tightening ring 162, thereby tightly clamping the air valve 12. As such, the pump head 1 is switched to an inflating state (see FIG. 3) from the initial state. By reversely rotating the cam lever 15 to switch the pump head 1 from the inflation state to the initial state, the air valve 12 can be detached from the pump head 1.

Because the distance between the first engagement surface 153 and the pivotal pin 14 is different from the second engagement surface 154 and the pivotal pin 14, rotating the cam lever 15 about the pivotal pin 14 to switch the pump head 1 between the initial state and the inflating state can encounter large impediment force. Further, in order to switch the pump head 1 between the initial state and the inflation state, one hand has to hold the cylindrical body 131, and the other has to operate the cam lever 15. Therefore, it is inconvenient to operate the pump head 1.

SUMMARY

Therefore, an object of the present disclosure is to provide a pump head that can alleviate at least one of the drawbacks of the prior art.

According to the present disclosure, a pump head for connecting an air supply source and an air valve includes a casing unit, a tightening member and a control unit.

The casing unit includes a main body configured for connecting the air supply source, and an abutment wall connected to the main body. The main body defines a casing chamber that has an installation section. The abutment wall has a valve-entering hole configured for allowing the air valve to enter the installation section.

The tightening member is disposed in the installation section proximally to the valve-entering hole and has a retaining hole configured for allowing the air valve to pass therethrough.

The control unit includes a control valve, a resilient member and a control lever. The control valve is movably disposed in the installation section. The resilient member urges the control valve to move toward the abutment wall and to pressingly clamp the tightening member between the control valve and the abutment wall. The control lever is pivotally connected to the main body and operable to move the control valve against the resilient member and away from the abutment wall.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
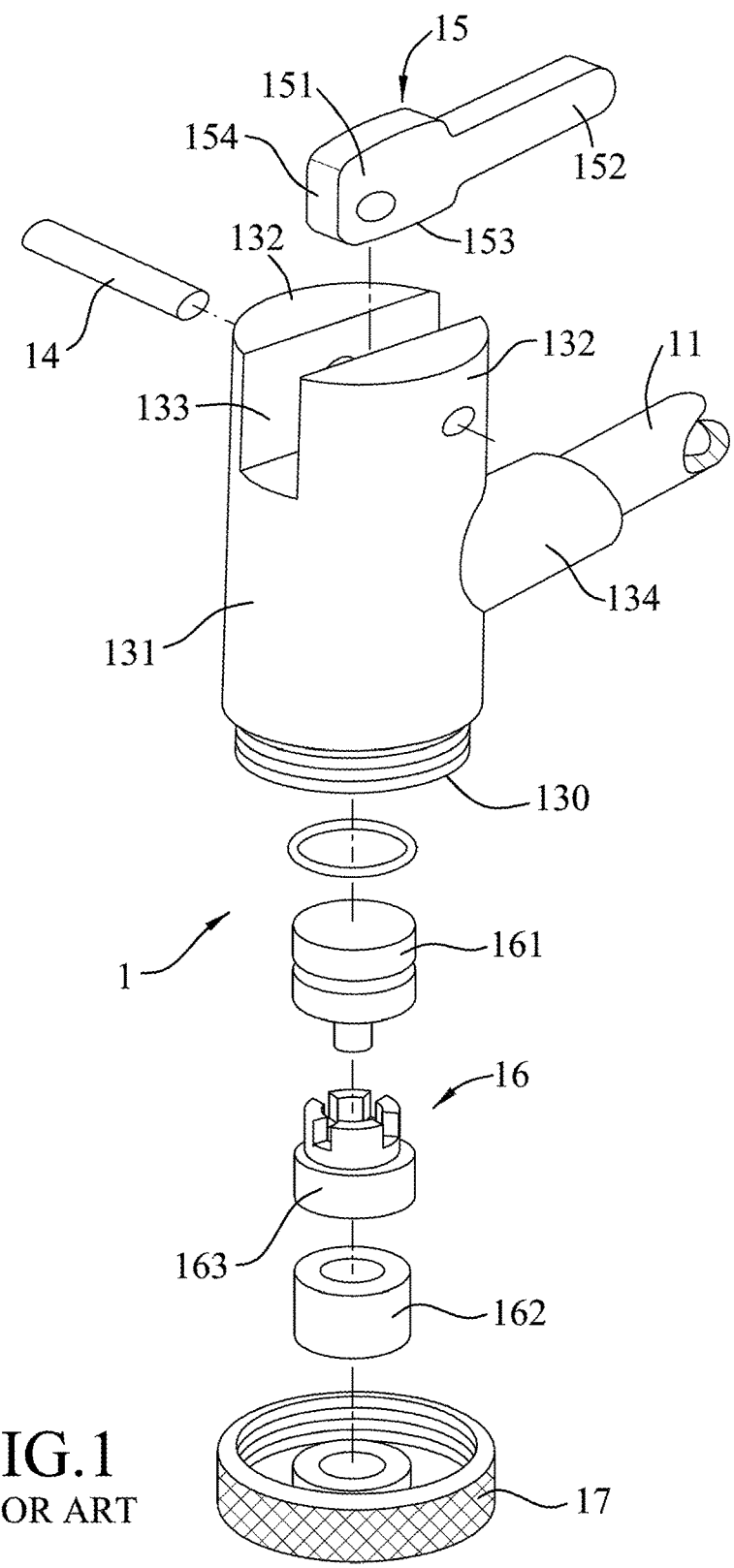
FIG. 1 is an exploded perspective view of a pump head disclosed in U.S. Pat. No. 5,762,095.
Figure 2:
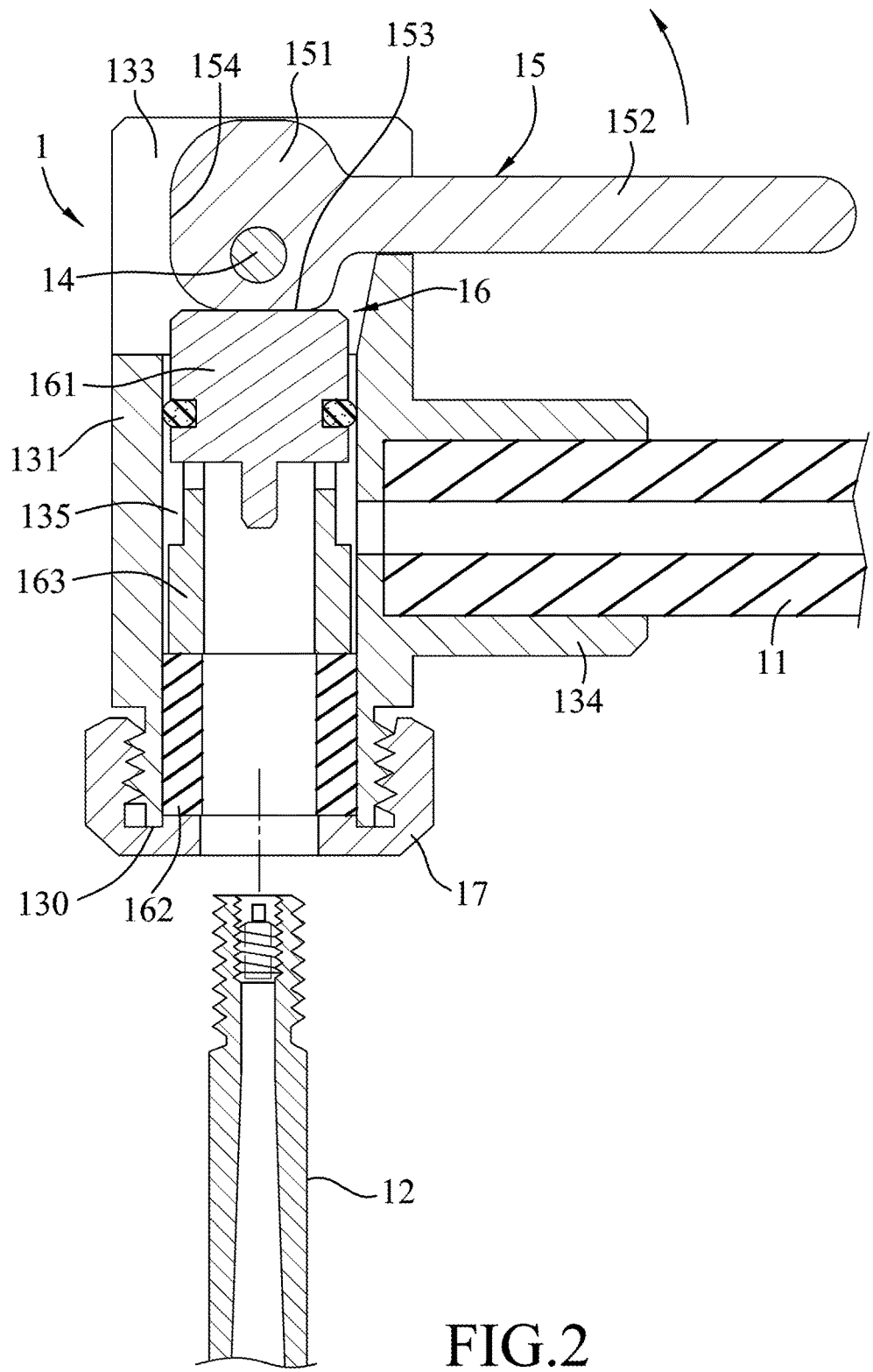
FIG. 2 is a fragmentary sectional view, illustrating the pump head being in an initial state.
Figure 3:
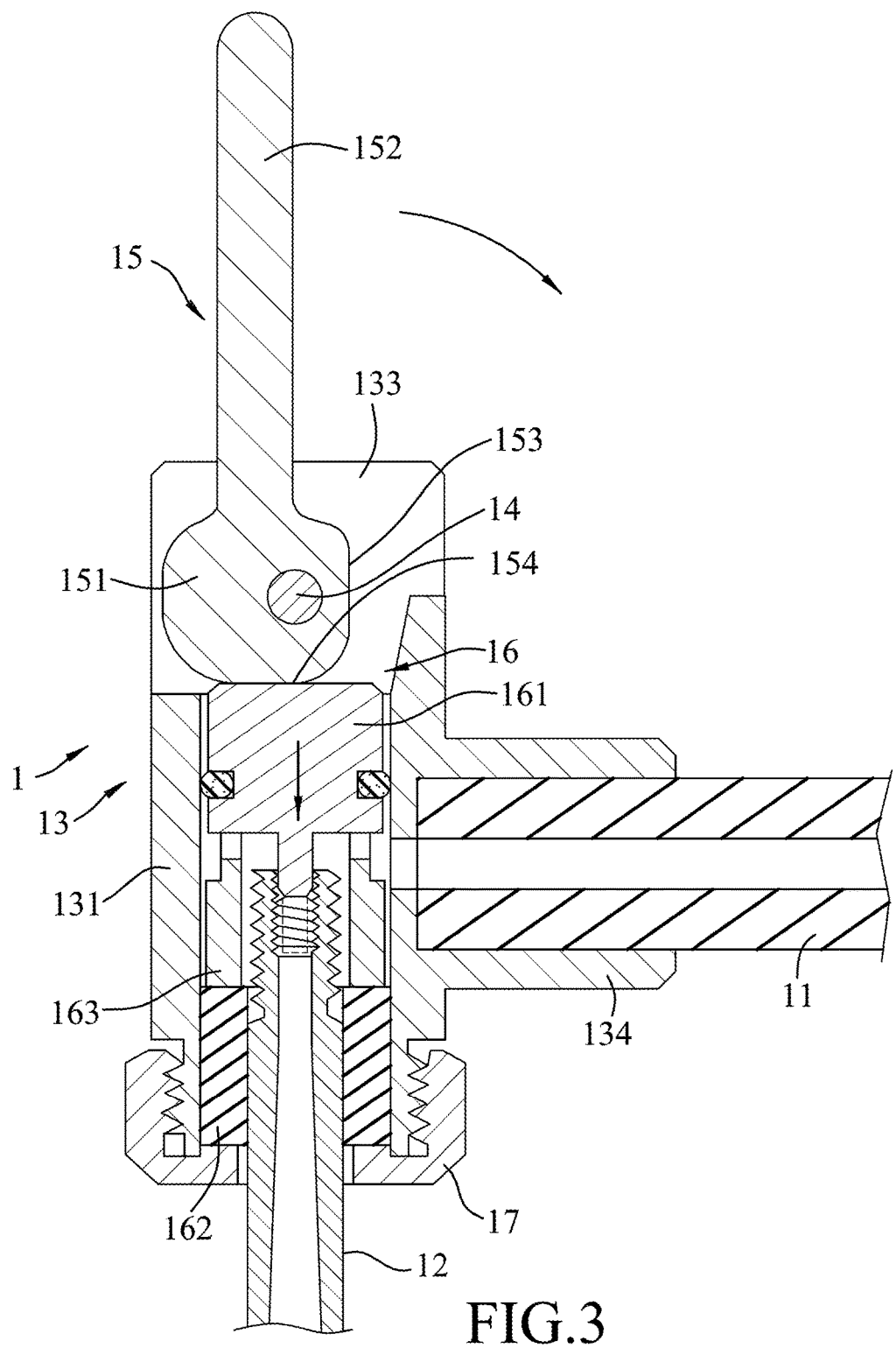
FIG. 3 is similar to FIG. 2, but illustrating the pump head being in an inflation state.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 4:
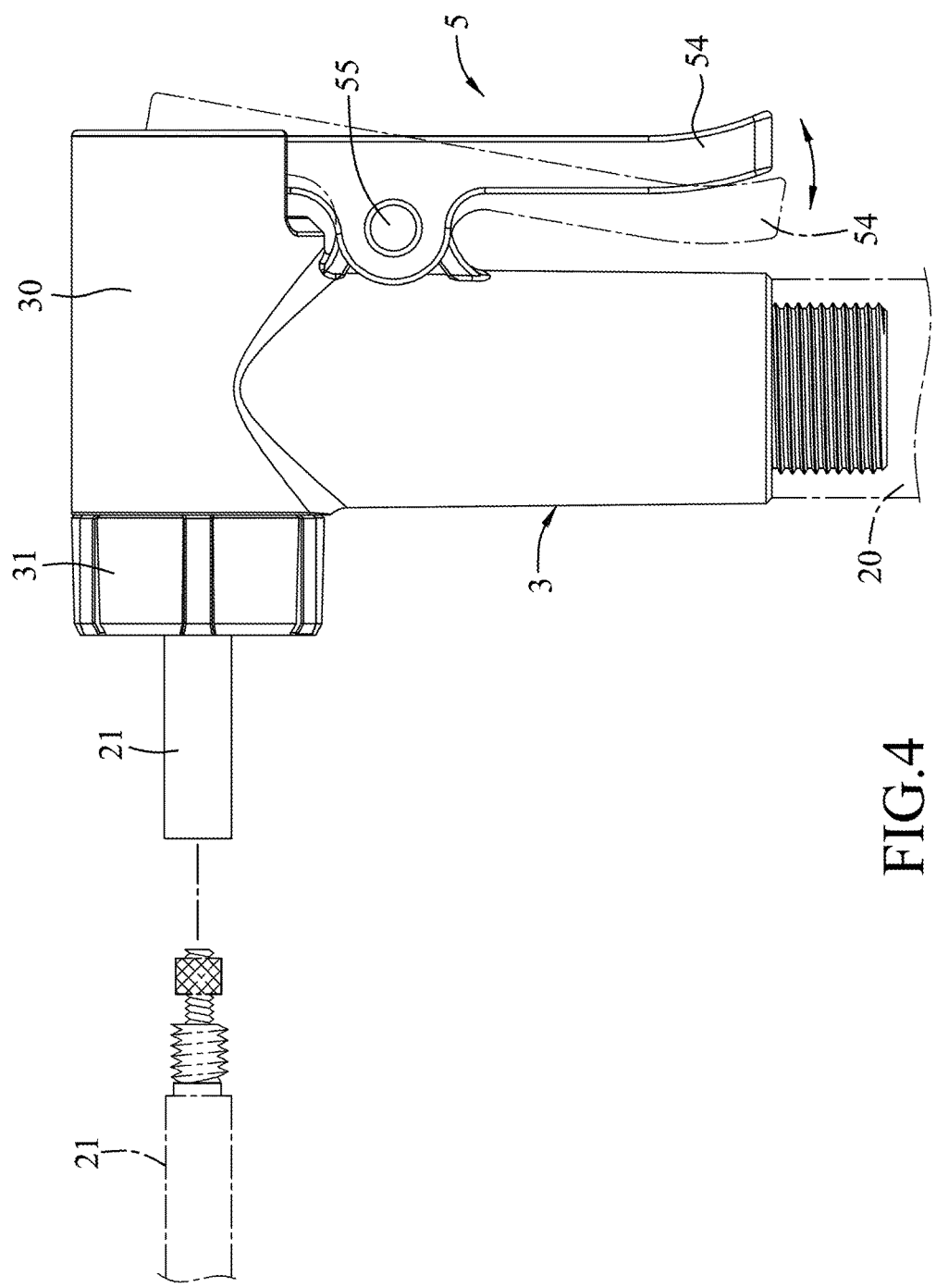
FIG. 4 is a side view, illustrating a pump head according to a first embodiment of the present disclosure, an air supply source and an air valve.
Figure 5:
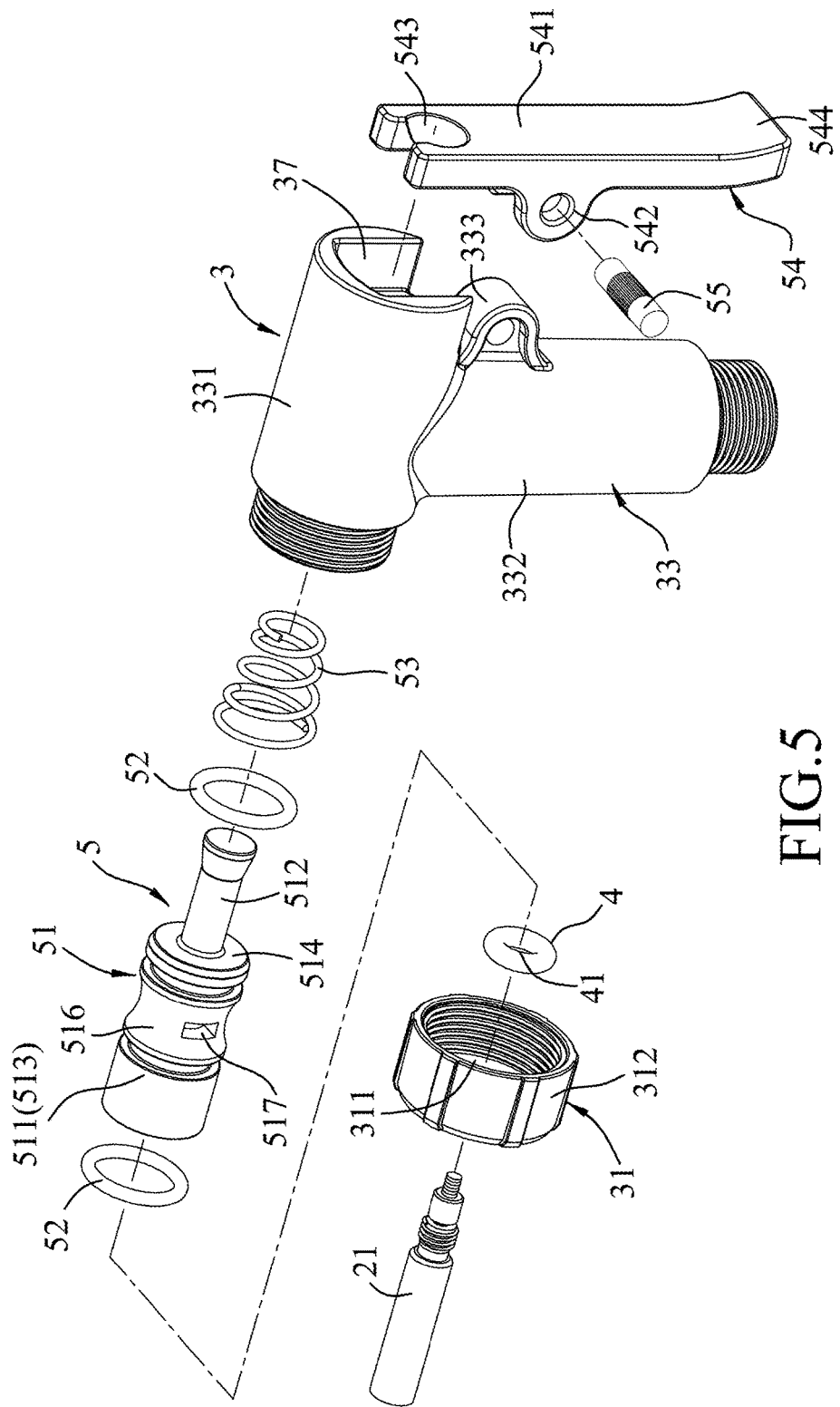
FIG. 5 is an exploded perspective view of the first embodiment.
Figure 6:
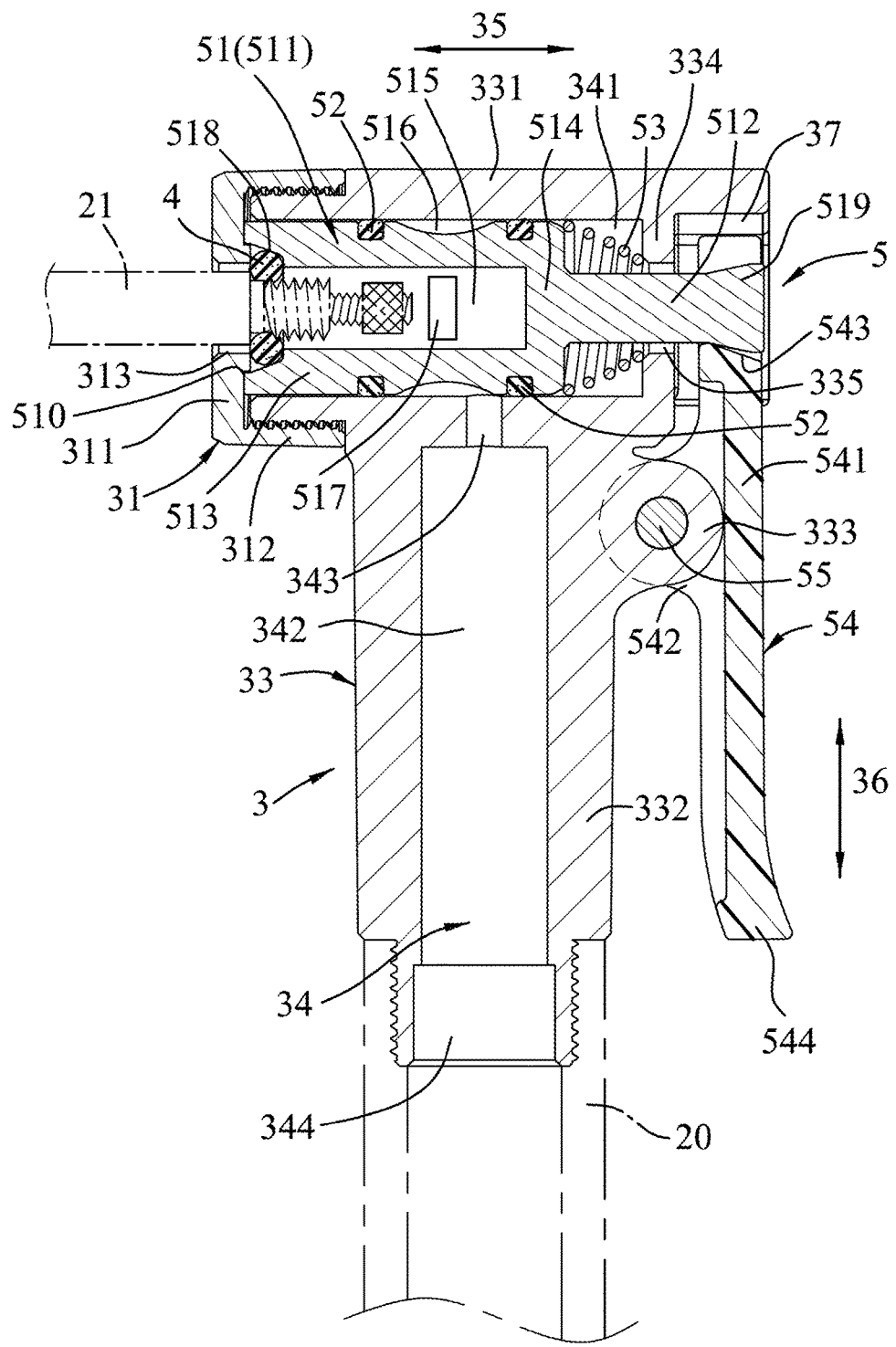
FIG. 6 is a sectional view of the first embodiment, illustrating the pump head being in a normal or non-operated state.

Referring to FIGS. 4 to 6, a pump head according to a first embodiment of the present disclosure is used for connecting an air supply source 20 and an air valve 21. In FIG. 4, only an air hose of the air supply source 20 is shown. The air valve 21 is a Presta valve. In this embodiment, the pump head includes a casing unit 3, a tightening member 4 and a control unit 5.

The casing unit 3 includes a main body 33 configured for connecting the air supply source 20 and an end cap 31 connected to the main body 33. The main body 33 defines a casing chamber 34, and includes a first tubular wall 331 that extends in a first direction 35, a second tubular wall 332 that is connected to the first tubular wall 331 and that extends in a second direction 36, a side collar 333 that projects outwardly from the second tubular wall 332 and that adjoins the first tubular wall 331, and a chamber end wall 334 that is perpendicularly connected to the first tubular wall 331. The chamber end wall 334 has a through hole 335 extending in the first direction 35. The first and second directions 35, 36 are perpendicular to each other, but are not limited thereto. The end cap 31 has an abutment wall 311 and a threaded wall 312. The abutment wall 311 is spaced apart from the chamber end wall 334 and has a valve-entering hole 313. The threaded wall 312 extends around the abutment wall 311 and is threadedly connected to the first tubular wall 331.

The casing chamber 34 has an installation section 341 surrounded by the first tubular wall 311 and disposed between the abutment wall 311 and the chamber end wall 334, and an air inlet section 342 surrounded by the second tubular wall 332. The air inlet section 342 has a first opening 343 fluidly communicating with the installation section 341, and a second opening 344 opposite to the first opening 343 and configured to connect the air supply source 20. The main body 33 further includes a compartment 37 defined by the first tubular wall 311 and the chamber end wall 334. The compartment 37 opens in a direction opposite to the chamber end wall 334. Although the casing unit 3 in this embodiment includes the main body 30 and the end cap 31, it is not limited thereto and may include two casing halves coupled to each other.

The tightening member 4 is disposed in the installation section 341 proximally to the valve-entering hole 313 of the abutment wall 311. In this embodiment, the tightening member 4 is made from a deformable resilient material and is a tightening ring having a retaining hole 41 fluidly communicating the valve-entering hole 313.

The control unit 5 includes a control valve 51, two sealing rings 52, a resilient member 53, a control lever 54 and a pivotal pin 55.

The control valve 51 is movably disposed in the installation section 341, and includes a hollow press part 511 and a rod part 512. The hollow press part 511 is movable along the first direction 35 in the installation section 341. The hollow press part 511 has a valve tubular wall 513, a valve end wall 514, and an inner air passage 515 that is defined by the vale tubular wall 513 and the valve end wall 514 and that is surrounded by the valve tubular wall 513. The valve tubular wall 513 has an open end 510 proximal to said abutment wall 311, an outer annular recess 516 that is formed in an outer periphery of the valve tubular wall 513 and that fluidly communicates with the first opening 343, and a through hole 517 fluidly communicating with the inner air passage 515 and the outer annular recess 516. The valve end wall 514 is connected to the valve tubular wall 513 and is disposed adjacent to the chamber end wall 334. In addition, an inner surface of the valve tubular wall 513 is recessed to form an annular recessed surface 518 that extends convergingly and inwardly from the open end 510. The valve end wall 514 is opposite to said open end 510. In this embodiment, the inner air passage 515 is surrounded by the valve tubular wall 513 between the valve end wall 514 and the open end 510. The tightening member 4 is disposed between the open end 510 and the abutment wall 311, and is engagingly received in the annular recessed surface 518.

The rod part 512 is connected to the valve end wall 514 of the hollow press part 511 and extends outwardly from the installation section 341 through the chamber end wall 334 to connect the control lever 54. In this embodiment, the rod part 512 has an enlarged end 519 disposed in the compartment 37 of the main body 33.

The sealing rings 52 are sleeved around the hollow press part 511, spaced apart along the first direction 35, and are respectively disposed on two opposite sides of the outer annular recess 516.

The resilient member 53 is a coiled spring that is disposed around the rod part 512 and that is disposed between the valve end wall 514 and the chamber end wall 334 within the installation section 341 to urge the control valve 51 to move toward the abutment wall 311 and to pressingly clamp the tightening member 4 between the control valve 51 and the abutment wall 311. The tightening member 4 is therefore placed in a deforming state. The resilient member 53 is adjacent to the valve end wall 514 and resiliently pushes the valve end wall 514 to move the open end 510 to the abutment wall 311.

The control lever 54 is pivotally connected to the side collar 333 of the main body 33 by the pivotal pin 55, and is operable to move the control valve 51 against the resilient member 53 and away from the abutment wall 311. In this embodiment, the control lever 54 includes a lever part 541 and a pivotal part 542 connected to the lever part 541. The pivotal part 542 is pivotally connected to the side collar 333 by the pivotal pin 55. In addition, the lever part 541 has an interlock recess 543 and a push end 544 respectively disposed on two opposite sides of the pivotal pin 55. The interlock recess 543 is disposed in the compartment 37 and is interlocked with the enlarged end 519 of the rod part 512.

Referring to FIG. 6, in combination with FIG. 4, when the pump head of the present disclosure is in a normal or non-operated state, because the resilient member 53 urges the control valve 51 toward the abutment wall 311 to pressingly clamp the tightening member 4 between the control valve 51 and the abutment wall 311, the tightening member 53 is placed in the deforming state, and the retaining hole 41 thereof is reduced in size and unable to allow the air valve 21 to pass there through into the pump head of the present disclosure.

Figure 7:
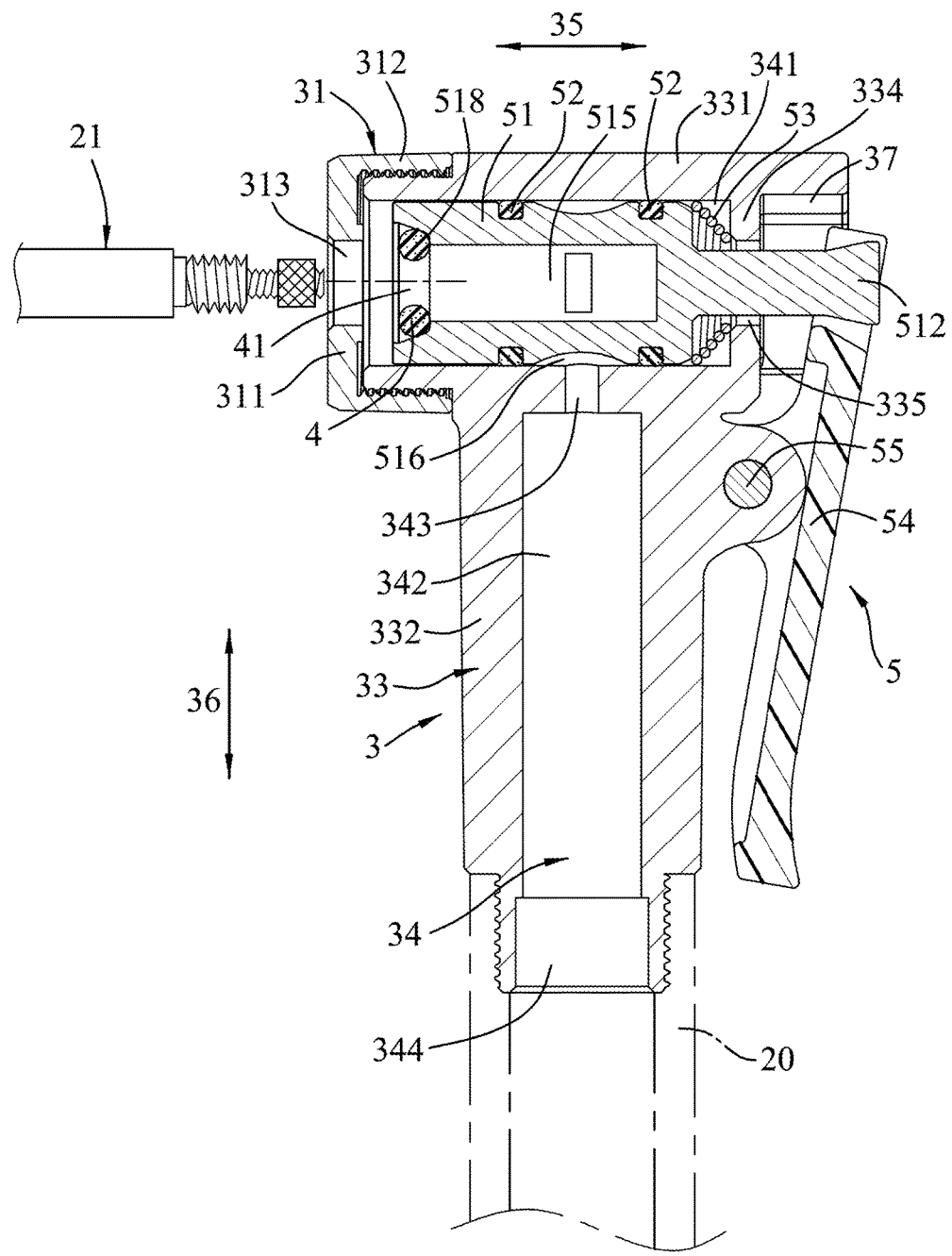
FIG. 7 is similar to FIG. 6, but illustrating the pump head of the first embodiment being in an operated state.

As shown in FIG. 7, the control lever 54 is operated by an external force to pivotally rotate about the pivotal pin 55 against a resilient force of the resilient member 53, so that the pump head of the present disclosure is switched from the normal state to an operated state for assembly/disassembly of the air valve 21. Because the control valve 51 is driven by the control lever 54 to move away from the abutment wall 311, the tightening member 4 is unclamped, and the retaining hole 41 expands to its original size by the restoring force of the tightening member 4. As such, the air valve 21 can enter the valve-entering hole 313 and extend into the inner air passage 515 by passing the retaining hole 41.

When the control lever 54 is released from the external force, the resilient force of the resilient member 53 pushes the control valve 51 to move toward the abutment wall 311 until the tightening member 4 is clamped between the control valve 51 and the abutment wall 311 and the pump head of the present disclosure returns back to the normal or non-operated state (see FIG. 6), where the tightening member 4 tightly holds the air valve 21. Therefore, air from the air supply source 20 flows into the air valve 21 by consecutively passing through the air inlet section 342, the first opening 343, the outer annular recess 516, the through hole 517 and the inner air passage 515. By using only one hand to hold and press the control lever 54 against the resilient member 53, the control valve 51 can be moved by the control lever 54 away from the abutment wall 311, and the air valve 21 can be removed from the pump head of the present disclosure.

Figure 8:
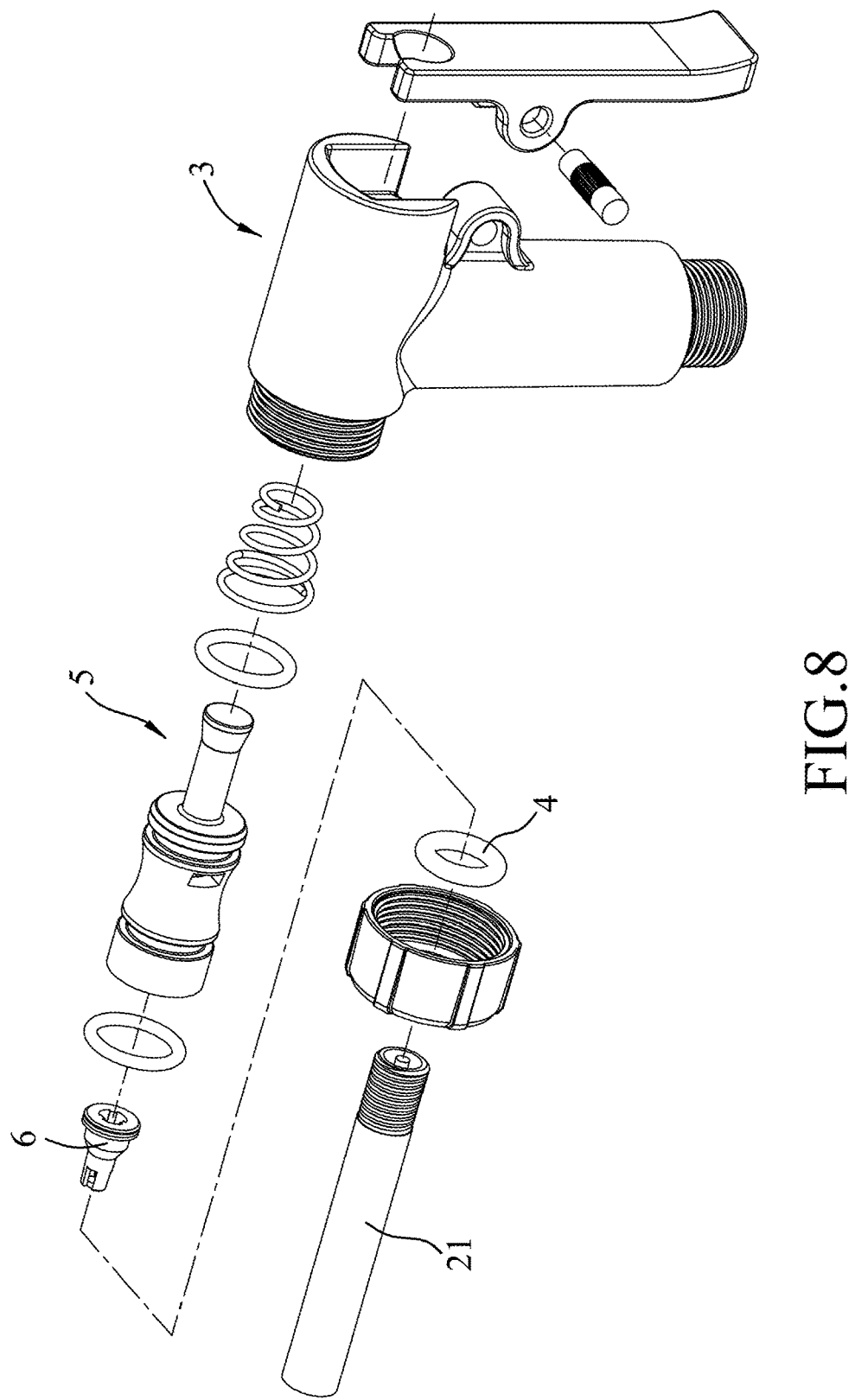
FIG. 8 is an exploded perspective view, illustrating a pump head according to a second embodiment of the present disclosure.
Figure 9:
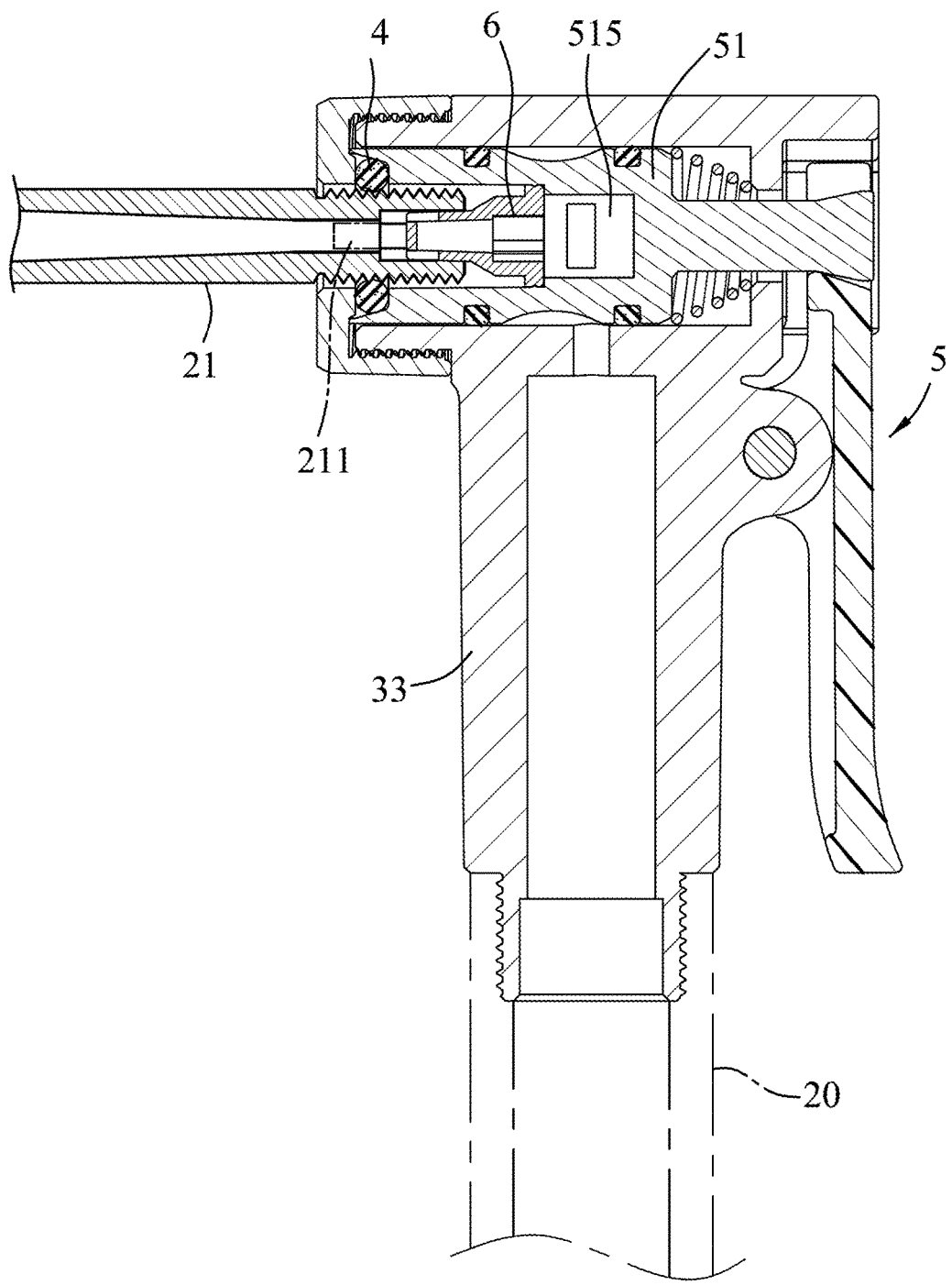
FIG. 9 is a sectional view of the second embodiment, illustrating the pump head being in a normal or non-operated state.

Referring to FIGS. 8 and 9, a pump head according to a second embodiment of the present disclosure is shown for connecting a Schrader valve 21 that has a valve core 211. The pump head of the second embodiment has a configuration generally similar to that of the first embodiment. However, in the second embodiment, the pump head further includes a core pusher 6 that is disposed in the inner air passage 515 of the control valve 51. The core pusher 6 is configured to push the valve core 211, so that a gas from the air supply resource 20 can flow into the Schrader valve 21.

To sum up, by using only one hand to hold and press the control lever 54, the resilient force of the resilient member 53 can be overcome to move the control valve 51 away from the abutment wall 311, and the pump head of the present disclosure can be easily and conveniently connected to, or disconnected from the Presta/Schrader valve.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A pump head for connecting an air supply source and an air valve, comprising:
    a casing unit including a main body configured for connecting the air supply source, and an abutment wall connected to said main body, said main body defining a casing chamber that has an installation section, said abutment wall having a valve-entering hole configured for allowing the air valve to enter said installation section;
    a tightening member disposed in said installation section proximally to said valve-entering hole and having a retaining hole configured for allowing the air valve to pass therethrough; and
    a control unit including a control valve, a resilient member and a control lever, said control valve being movably disposed in said installation section, said resilient member urging said control valve to move toward said abutment wall and to pressingly clamp said tightening member between said control valve and said abutment wall, said control lever being pivotally connected to said main body and operable to move said control valve against said resilient member and away from said abutment wall.

2. The pump head as claimed in claim 1, wherein said casing unit further includes an end cap that is connected to said main body and that has said abutment wall, said main body including a first tubular wall that extends in a first direction and that surrounds said installation section, and a chamber end wall that is connected to said first tubular wall and that is spaced apart from said abutment wall, said installation section being disposed between said abutment wall and said chamber end wall.

3. The pump head as claimed in claim 2, wherein said main body further includes a second tubular wall that is connected to said first tubular wall and that extends in a second direction, said casing chamber further having an air inlet section surrounded by said second tubular wall, said air inlet section having a first opening fluidly communicating with said installation section, and a second opening opposite to said first opening and configured to connect the air supply source.

4. The pump head as claimed in claim 3, wherein the first and second directions are perpendicular to each other.

5. The pump head as claimed in claim 3, wherein said control valve includes a hollow press part that is movable along the first direction in said installation section, said hollow press part having an inner air passage for insertion of the air valve, an outer annular recess formed in an outer periphery of said press part and fluidly communicating with said first opening, and a through hole fluidly communicating with said inner air passage and said outer annular recess.

6. The pump head as claimed in claim 5, wherein said control unit further includes two sealing rings sleeved around said hollow press part, said sealing rings respectively disposed on two opposite sides of said outer annular recess.

7. The pump head as claimed in claim 5, wherein said control valve further includes a rod part that is connected to said hollow press part and that extends outwardly through said chamber end wall, said control lever including a lever part and a pivotal part connected to said lever part, said control unit further including a pivotal pin, said pivotal part being pivotally connected to said main body by said pivotal pin, said lever part having an interlock recess that is interlocked with said rod part, and a push end, said interlock recess and said push end being respectively disposed on two opposite sides of said pivot pin.

8. The pump head as claimed in claim 5, wherein said hollow press part further has a valve tubular wall and a valve end wall, said valve tubular wall surrounding said inner air passage, said valve end wall being connected to said valve tubular wall and disposed adjacent to said chamber end wall, said resilient member being disposed between said valve end wall and said chamber end wall.

9. The pump head as claimed in claim 8, wherein said valve tubular wall has an open end proximal to said abutment wall, an inner surface of said valve tubular wall being recessed to form an annular recessed surface that extends convergingly and inwardly from said open end, said tightening member being engagingly received in said annular recessed surface.

10. The pump head as claimed in claim 5, further comprising a core pusher that is disposed in said inner air passage of said control valve and that is configured to push a valve core of the air valve.

11. The pump head as claimed in claim 1, wherein said control valve includes an inner air passage that fluidly communicates with said casing chamber and that is configured to allow insertion of the air valve.

12. The pump head as claimed in claim 1, wherein said control valve includes a hollow press part movably disposed in said installation section, said hollow press part having a valve tubular wall, a valve end wall, and an inner air passage, said valve tubular wall having an open end proximal to said abutment wall, said valve end wall being opposite to said open end, said inner air passage being surrounded by said valve tubular wall between said valve end wall and said open end, said tightening member being disposed between said open end and said abutment wall, said resilient member being adjacent to said valve end wall and resiliently pushing the same to move said open end to said abutment wall.

13. The pump head as claimed in claim 12, wherein said control valve further includes a rod part connected to said valve end wall and extending outwardly of said installation section to connect said control lever, said resilient member being a coiled spring disposed around said rod part within said installation section.

\* \* \* \* \*